3,010,926
RUBBERIZED BLOWN ASPHALT AND METHOD
FOR MAKING SAME
Frank B. Odasz, Jr., Cody, Wyo., and John R. Hartwig, Bienfait, Saskatchewan, Canada, assignors to Husky Oil Company, Cody, Wyo., a corporation of Delaware
No Drawing. Filed June 18, 1959, Ser. No. 821,085
16 Claims. (Cl. 260—28.5)

The present invention relates to asphaltic compositions and, more particularly, to compositions consisting essentially of asphalt having minor proportions of rubber interblended therewith, or intimately dispersed therein, herein designated rubberized asphalt. The invention provides such asphaltic compositions having novel and highly useful physical and chemical properties and also provides a commercially practical and economical method for producing such compositions and for regulating and controlling the properties thereof.

This application is, in part, a continuation of our copending application Ser. No. 624,959, filed November 29, 1956, now abandoned.

It has heretofore been recognized that by properly interblending a natural or synthetic rubber with an unblown asphalt, a marked change in the physical properties of the asphalt, such as durability, ductility, adhesion, toughness and tenacity, can be obtained, resulting in a product definitely superior for many uses. It has also been proposed to disperse rubber in blown asphaltic compositions. However, where a blown asphalt has been so used, the physical characteristics of the resultant product have not heretofore been satisfactory, predictable or readily controllable.

The nature of such dispersions of rubber in asphalt is not fully understood. Microscopic examination of interblends of rubber and unblown asphalt has revealed the presence of discrete particles and threads of the rubber, suggesting that, in part at least, the dispersion is a physical admixture. However, it appears that a substantial portion of the rubber dispersed in the asphalt is more intimately blended therewith, as though dissolved in, or even chemically united with, the asphalt. It appears, more particularly, that the improved properties of the blend are primarily brought about by this more intimate association of the rubber and asphalt molecules, rather than by the less intimate dispersion of discrete particles or threads of the rubber in the asphalt. It has further been observed that where the asphaltic constituent does not have an affinity for, or capacity to absorb, the rubber in a manner akin to dissolving it, attempts to rubberize such asphalt have generally been unsuccessful.

A striking example of asphalts which do not normally have such an affinity for, or capacity to thus absorb, the rubber are the conventional, so-called blown asphalts. These blown asphalts normally have chemical characteristics or molecular structures which are considerably different from those of the cracked, straight-run or vacuum-reduced asphalts, which have heretofore been successfully rubberized. The blowing operation by which such blown asphalts are produced involves heating an asphalt, usually as an asphalt flux, to a temperature of about 400–450° F. and oxidizing the mass by blowing air therethrough.

The result of this oxidation is a change in the nature of the entire mass and the purpose is normally that of producing a harder asphalt of higher softening point, usually of the order of 170° F. or higher. Other physical and chemical charcteristics of the asphalt which have generally been changed by this blowing operation include the development of greater resistance to flow and weathering and the development of an apparently more negative affinity of the resultant blown asphalts for the various rubbers with which it has been attempted to blend them.

The increased softening points of these blown asphalts have made it necessary to heat them to a higher temperature in order to render the asphalt sufficiently fluid for ready mixing with the rubber, temperatures indeed so high as to cause injury to the rubber before it could be satisfactorily interblended with the hot blown asphalt.

The present invention provides an improved method of producing rubberized blown asphalts comprising a plurality of cooperating steps by which the beneficial effects of the interblending of rubber with the blown asphalt are readily, economically and more fully attained, resulting in rubberized blown asphalts having novel and highly useful properties and combinations of properties by which they are especially adapted to a wide range of commerical uses, including paper laminants, road building, crack fillers, waterproofing, plastic asphalts, primers and the like, particularly where the low temperature characteristics of the asphaltic compositions are a major consideration.

By our improved process, the higher softening point of the blown asphalts is no longer a problem and the rubber is intimately interblended therewith without destruction of the desirable properties of the rubber, whether by depolymerization or objectionable copolymerization of the rubber molecules.

In previous attempts to produce rubberized blown asphalts, it has been proposed, for instance, to mix asbestos fibers, or the like, with the blown asphalt in a plastic state and thereafter mix a rubber latex with the resultant plastic asphaltic material. It has also been proposed to mix an aqueous rubber latex with an oil-in-water type emulsion of blown asphalt.

The process and product of our present invention are distinguished from those proposed in that we are here concerned with a rubberized blown asphalt which is substantially free from water and which consists essentially of a dispersion of rubber in blown asphalt without added mineral or vegetable fibers.

It has further been proposed to mix the latex with unblown asphalt, thereafter blowing the mixture. But to our knowledge, that procedure has not given results satisfactory for our purposes perhaps due, in part at least, to the subjecting of the rubber to excessive temperatures during the prolonged blowing operation.

We have found that the characteristics of the blown asphalt, prior to rubberizing, and the manner in which it is produced, and also the method by which the rubber is interblended with the asphalt, are of utmost importance and cooperate to produce the desired novel results.

The nature of the base asphalt, i.e., the asphalt used in making the flux to be blown, does not appear to be critical. It may, for instance, be a natural asphalt or one produced from petroleum, such as the conventional, so-called cracked, vacuum-reduced or straight-run asphalts. Similarly, characteristics of the specific flux oil used is not critical and may be varied over a wide range. Likewise, the blowing temperature and rate of blowing are not critical. Conventional blowing apparatus may be used. However, it is essential that the asphalt flux, prior to blowing, be adjusted to an SFS viscosity within the range of about 40 to about 300, at 210° F., preferably to about 75 to 175 SFS, and that this flux be air blown to a softening point within the range extending from about 80° to about 165° F., more advantageously 125°–150° F. We have found that the softening point to which the flux is blown is of primary importance in determining the characteristics of the resultant rubberized blown asphalt. We have found that where the flux is blown to a softening point in excess of about 165° F., the subsequent interblending with rubber does not bring about the desired change with respect to penetration, ductility and stain properties of the rubberized product, particularly those characteristics at low temperatures. Similarly, where the asphalt flux is not blown to a softening point of at least as high as 80° F., the desired properties of the product are not obtained.

The characteristics, and combinations of characteristics, embodied in the resultant rubberized blown asphaltic compositions, produced in accordance with our present invention, may be varied over a surprising range to meet special requirements, as to (a) softening point temperature, (b) penetration at 77° F., (c) penetration at 32° F., (d) ductility at 77° F., (e) ductility at 39.2° F. and (f) stain characteristics, by varying the operating conditions and extent of the blowing step and the nature and proportion of the rubber interblended with the resultant blown asphalt, as hereinafter more fully described.

As previously noted, a second essential feature of our present invention is the manner in which the rubber is interblended with the resulting blown asphalt.

In accordance with our present process, this interblending is effected by introducing the rubber in the form of an aqueous latex into a molten body of the blown asphalt. In order to obtain the required more intimate association of the rubber and asphalt molecules, it is essential that the rubber of the latex be quickly, thoroughly and uniformly dispersed in the blown asphalt while the latter is in a molten, highly fluid condition.

The normally high melting point of blown asphalts requires that they be highly heated in order to bring them to such highly fluid condition, i.e., to temperatures considerably higher than those which the rubber can withstand. It is equally important, however, that the rubber not be subjected to thermal conditions by which the rubber is deleteriously affected, i.e., by depolymerization or copolymerization of the rubber molecules to non-elastic materials. Further, the blown asphalt should not be heated to temperatures at which the essential qualities of the blown asphalt are destroyed. Thus the rubberizing of blown asphalts has presented exceptionally difficult problems.

We have found that the desired intimate interblending of the rubber with blown asphalt can be satisfactorily and economically effected, without injury to either the rubber or the blown asphalt, by introducing the aqueous rubber latex into a flowing, confined body or stream of the blown asphalt, which at the point of such introduction, is at a temperature at which the asphalt is highly fluid, substantially in excess of that at which the rubber is deleteriously affected, but below that at which the blown asphalt is deleteriously affected, and such that the latex-water is quickly flashed into steam, causing violent agitation, and thereby atomizing and intimately dispersing the rubber solids of the latex in the hot asphalt, as described and claimed in copending application Ser. No. 457,680, filed September 22, 1954, now Patent 2,921,105. Heat absorbed by this flashing of the latex-water into steam quickly lowers the temperature of the mixture to a safe temperature for the rubber before the rubber can be damaged. The resultant mixture of steam, blown asphalt and rubber is, with advantage, continued through the confining conduit for a brief period to insure uniform dispersion of the rubber solids throughout the asphalt and is then discharged into a vessel providing a free surface to permit disengagement of the steam from the mixture.

Where the resultant hot asphaltic mixture is relatively rapidly cooled, as in pilot plant operation in which relatively small volumes of the rubberized asphalt are involved, we have found it advantageous to stir the mixture vigorously as it cools through the temperature range of about 390° to 340° F. However, this stirring does not appear to be essential to the obtaining of a satisfactory, homogeneous product, particularly in large-scale commercial operations.

In copending application Ser. No. 535,600, filed September 21, 1955, now Patent 2,921,313 of which one of us is the applicant, there is described and claimed a process, similar to that described above, which we have found highly effective for carrying out the interblending step of our present process.

In accordance with the process of Patent 2,921,313, the asphalt, at the point of introduction of the latex, is at a temperature so coordinated with the amount of water present in the selected proportion of the latex to be introduced, and the proportions and specific heat characteristics of the asphalt and of the rubber, that the temperature of the mixture is quickly reduced, primarily by evaporation of the latex-water, to below that at which the rubber is deleteriously affected, but above the foaming temperature of the mixture, e.g., not below about 325° F. By this procedure, the interblending and expelling of the latex-water are effected without forming objectionable, persistent foam or froth previously encountered in dewatering asphalt mixtures.

We have found that, where the procedure of Patent 2,921,313 is used to carry out the interblending step of our present process, the initial temperature of the blown asphalt should be within the range of about 450° to about 600° F., depending upon the amount of latex-water to be evaporated, and that the temperature of the resultant mixture should fall to a temperature not below 325° F. preferably within the range extending from about 350° to about 400° F.

Accordingly, the interblending step of our present process may, with particular advantage, be effected by injecting, or otherwise introducing, the selected rubber latex, at a constant predetermined rate, into a body of the hot blown asphalt flowing at a constant rate as a confined stream, the proportion of latex so introduced being equivalent to the predetermined amount of rubber solids to be incorporated in the blown asphalt.

The temperature of the body of asphalt at the point where the latex is introduced must be sufficiently high to cause the latex-water to flash into steam upon contact with the asphalt, resulting in vigorous agitation and thereby effecting rapid dispersion and interblending of the rubber with the hot asphalt. The absorption of heat by the evaporation of the latex-water causes a sudden reduction in the temperature of the mixture to below that at which the rubber is deleteriously affected but not lower than the temperature at which the particular asphalt remains highly fluid.

As above indicated, the initial temperature of the asphalt should generally be within the range from about 450° to about 600° F., but should not exceed that at which the asphalt is injured. Usually, the initial temperature of the asphalt should be as high as permissible, with due consideration of the other requirements previously noted and, particularly, the proportion of latex-water to be evaporated. The proportion of water present in the latex used may be varied over a considerable range and may, with advantage, be so coordinated with the initial temperature of the asphalt as to produce the desired temperature drop.

By this method of interblending, the dispersing of the rubber in the molten blown asphalt and the reduction in temperature of the mixture are accomplished so rapidly that while full advantage is taken of the high temperature in promoting the desired intimate interblending, the period of time during which the rubber is subjected to such high temperature is so brief to avoid damaging the rubber.

The resultant mixture of asphalt, rubber and steam, still in a highly fluid condition, is continued as a confined flowing stream for a period sufficient to assure uniform dispersion of the rubber throughout the asphalt and the mixture is then passed to an open vessel, or other chamber, adapted to the disengaging of the steam from the mixture. In order to expedite this disengagement of the steam, it is especially desirable that, in accordance with Patent 2,921,313, the initial temperature of the asphalt should be so coordinated with the amount of latex-water to be vaporized that the temperature of the mixture not fall below its foaming temperature, preferably not below 325° F.

Though the previously described methods of carrying out the interblending step have been found to give especially satisfactory results, other methods of carrying out this step, which involve rapid mixing of the rubber with the blown asphalt while the latter is in a molten, highly fluid condition, preferably at a temperature in excess of about 450° F., and a sudden reduction of the temperature to below that at which the rubber is injured, may be employed.

In conjunction with this interblending step just described, we have found that the manner in which the blown asphalt is prepared profoundly affects the characteristics of the resultant rubberized blown asphalt. We have further found that the type and proportion of latex used markedly influence the characteristics of the product.

We have, with partciular advantage, used aqueous latices of synthetic rubbers of the neoprene type and of the GRS (butadiene-styrene) type in proportions within a range equivalent to about 0.5% to about 5% of rubber solids, based on the weight of the asphalt, and the invention will be more particularly illustrated with reference to those particular synthetic rubbers. However it will be understood that the invention also contemplates the use of natural rubber in latex form and even in excess of 5% of the natural or synthetic rubber solids.

For producing rubberized blown asphalt compositions especially suited for use as joint or crack fillers and the like, we have, with particular advantage, interblended with the blown asphalt synthetic rubbers of the types just noted in proportions within the range of about 2.5% to about 4.5%. Similarly, in producing rubberized blown asphaltic compositions especially suited for use as paper laminants, we have found proportions of these synthetic rubbers within the range of about 0.5 to about 3% to be particularly advantageous.

As we have previously noted, the usual purpose of air blowing an asphalt is to increase its hardness, to increase its softening point and reduce penetration at ordinary temperatures, at 77° F., for instance. However, we are here particularly concerned with the production of an air blown asphalt especially amenable to interblending with rubber for the production of rubberized asphalts having novel and highly desirable low temperature characteristics, as indicated, for instance by penetration values at 32° F. and ductility at 39.2° F. These characteristics have not heretofore been predictable from the softening point and penetrations at normal temperatures of the blown asphalt constituent. To our knowledge, there has not heretofore been available a satisfactory method or dependable criteria for producing rubberized blown asphalt compositions of the desired low temperature properties.

We have found, as previously noted, that asphalts especially suited for our purpose are produced by air blowing an asphalt flux having a viscosity within the range of about 40 to about 300 SFS, at 210° F., to a softening point not in excess of about 165° F. and not less than about 80° F. The preparation of the flux to be blown is subject to considerable variation as to nature of the flux oil and characteristics and origin of the base asphalt, as previously noted herein. In the specific examples hereinafter shown, as illustrations of our invention, we have used a petroleum vacuum distilled asphalt derived from a Wyoming Block crude and as the flux oil we have used a viscous petroleum oil fraction such as conventionally used for that purpose, namely, one having an A.P.I. gravity within the range of 11–20. The proportion of the flux oil added will, of course, be determined by the nature of the base asphalt and the desired flux viscosity.

By varying the initial flux viscosity and the softening point to which the flux is blown, within the above prescribed ranges, marked variation in the properties of the rubberized blown asphalt may be effected, as hereinafter illustrated. Another condition materially affecting the characteristics of the rubberized product is whether or not a blowing catalyst is used. In accordance with the process of our present application, no catalyst is employed in the blowing operation.

In our related copending applications Ser. No. 821,087 and Ser. No. 821,086, filed concurrently herewith, the blowing step is effected in the presence of $P_2O_5$ and sulfur catalysts, respectively.

The way in which the characteristics and combinations of properties of the resultant rubberized blown asphalt may be varied in accordance with our present process is illustrated by a series of runs, the characteristics of the products of which are set forth in the following Table I. For purposes of more accurate comparison, the variables in the respective operations have been restricted to a minimum. It will be understood, however, that the invention is not limited in scope to the particular conditions and products of this series of runs.

In each case, the base asphalt was a conventional vacuum reduced Wyoming petroleum asphalt having a penetration of about 265 dmm. at 77° F. cut to the indicated flux viscosity by incorporating therein, before blowing, a gas oil of an A.P.I. viscosity of 16. The blowing temperature in each case was 450° F. and the blowing was continued until the softening points indicated in Table I were obtained. Separate portions of each batch of the blown asphalts were then rubberized by interblending therewith proportions of neoprene latex 735 and proportions of GRS–2006 (butadiene-styrene) rubber latex, respectively, equivalent to the percentages of rubber solids set forth in Table I, and the physical characteristics of the unrubberized blown asphalt and of the respective rubberized blown asphalts produced therefrom, as determined by conventional methods, were as recorded. The stain properties of the rubberized blown asphalts are also included in the tabulation.

In each of the interblending operations, the latex was rapidly mixed with the blown asphalt preheated to a temperature at which it was in a molten, highly fluid condition and such that the latex-water was quickly flashed into steam causing intimate dispersion of the rubber solids in the hot asphalt and lowering the temperature of the dispersion, as hereinbefore described.

Table I

| Blown asphalt | Flux vis. at 210° F., SFS | Blown to S.P., °F. | Rubber — Increase in S.P., °F. | | | | Rubber — Penetration at 77° F. | | | | | Rubber — Penetration at 32° F. | | | | |
|---|---|---|---|---|---|---|---|---|---|---|---|---|---|---|---|---|
| | | | Neoprene | | GRS | | None | Neoprene | | GRS | | None | Neoprene | | GRS | |
| | | | 2.1% | 4.2% | 2.1% | 4.2% | | 2.1% | 4.2% | 2.1% | 4.2% | | 2.1% | 4.2% | 2.1% | 4.2% |
| 1 | 39 | 108 | 9 | 21 | 19 | 47 | 218 | 166 | 148 | 152 | 147 | 77 | 63 | 64 | 78 | 84 |
| 2 | 39 | 130 | 13 | 25 | 24 | 47 | 99 | 87 | 80 | 78 | 80 | 48 | 43 | 42 | 48 | 49 |
| 3 | 39 | 153 | 17 | 39 | 27 | 63 | 59 | 49 | 50 | 57 | 58 | 32 | 26 | 26 | 36 | 37 |
| 4 | 106 | 105 | 7 | 13 | 15 | 30 | 203 | 166 | 161 | 152 | 136 | 62 | 53 | 58 | 59 | 62 |
| 5 | 106 | 128 | 14 | 22 | 20 | 36 | 78 | 67 | 73 | 75 | 70 | 34 | 30 | 31 | 38 | 34 |
| 6 | 106 | 149 | 17 | 24 | 26 | 58 | 44 | 39 | 41 | 48 | 45 | 24 | 21 | 18 | 24 | 22 |
| 7 | 293 | 98 | 6 | 12 | 7 | 19 | 297 | 253 | 240 | 230 | 176 | 61 | 58 | 60 | 58 | 50 |
| 8 | 293 | 124 | 11 | 19 | 12 | 28 | 76 | 67 | 66 | 72 | 57 | 25 | 22 | 20 | 26 | 27 |
| 9 | 293 | 146 | 12 | 17 | 13 | 41 | 39 | 36 | 36 | 39 | 38 | 13 | 13 | 10 | 16 | 16 |

| Blown asphalt | Rubber — Ductility at 77° F. | | | | | Rubber — Ductility at 39.2° F. | | | | | Stain | | | | |
|---|---|---|---|---|---|---|---|---|---|---|---|---|---|---|---|
| | None | Neoprene | | GRS | | None | Neoprene | | GRS | | None | Neoprene | | GRS | |
| | | 2.1% | 4.2% | 2.1% | 4.2% | | 2.1% | 4.2% | 2.1% | 4.2% | | 2.1% | 4.2% | 2.1% | 4.2% |
| 1 | 59 | 103 | 87 | 48 | 10 | 9.2 | 20 | 27 | 88 | 35 | 172 | 48 | 47 | 75 | 49 |
| 2 | 14.6 | 32 | 53 | 16 | 8 | 4.5 | 9 | 12 | 25 | 18 | 67 | 44 | 43 | 48 | 44 |
| 3 | 5.3 | 8 | 10 | 8 | 6 | 3.3 | 6 | 8 | 10 | 2 | 55 | 40 | 39 | 43 | 39 |
| 4 | 100 | 150+ | 150+ | 58 | 47 | 27.4 | 45 | 59 | 150+ | 134 | 105 | 49 | 45 | 60 | 51 |
| 5 | 23.5 | 48 | 75 | 19 | 15 | 5.5 | 9 | 16 | 111 | 33 | 58 | 42 | 41 | 43 | 41 |
| 6 | 7.2 | 15 | 27 | 16 | 9 | 0 | 6 | 6 | 3 | 2 | 43 | 39 | 36 | 41 | 39 |
| 7 | 100 | 90 | 150+ | 150+ | 150+ | 150+ | 150+ | 125+ | 150+ | 150+ | 153 | 56 | 51 | 69 | 64 |
| 8 | 93 | 113 | 132 | 31 | 28 | 7.5 | 16 | 36 | 150+ | 93 | 58 | 44 | 41 | 53 | 44 |
| 9 | 23 | 35 | 60 | 21 | 14 | 0 | 6 | 14 | 2.0 | 2.0 | 47 | 41 | 38 | 40 | 28 |

As appears from the foregoing tabulation, the softening point of the rubberized blown asphalt is generally increased as the percentage of rubber interblended therein is increased. However, we have found that other variables in the production of the blown asphalt materially affect the rate of this increase independently of the amount of rubber used. Usually, it has been found that this rate of increase of softening point increases as the viscosity of the flux asphalt, prior to blowing, is decreased. In other words, we have found that, in general, the lower the viscosity of the flux prior to blowing, within the prescribed range, the greater the increase in softening point, relative to the proportion of rubber added.

We have further found that the rate of increase in softening point brought about by the interblending of a butadiene-styrene synthetic rubber with the blown asphalt is greater than that effected by the interblending of an equal proportion of neoprene with the same asphalt. We also found that the rate of increase in softening point of the product is increased as the softening point to which the asphalt flux is blown is increased.

Significant independent variables in the blowing step are, therefore, the initial flux viscosity and the softening point to which the asphalt is blown. However, the omission of blowing catalyst from the flux during the blowing operation has been found materially to affect the properties of the rubberized product.

The higher the softening point to which the asphalt flux is blown, the lower the penetration of the rubberized blown asphalt at 77° F. But, by increasing flux viscosity, the effect of the softening point of the blown asphalt on the 77° F. penetration of the rubberized product may be increased. An increase in the rubber concentration in asphalt blown to a softening point of 100° F. normally causes a major decrease in the penetration of the resultant rubberized asphalt at 77° F. But such increase in rubber concentration has a much smaller effect on asphalts blown to a softening point of 125° F. or 150° F. It follows, therefore, that the interblending of the rubber in portions up to approximately 2% has a greater effect on penetration of the product at 77° F. than is obtained by a like further increase in the proportion of rubber.

Also, as shown by the foregoing tabulation, the penetration of the rubberized blown asphalt at 32° F. is controlled largely by the initial viscosity of the flux and the softening point to which the flux is blown. As the softening point to which the flux is blown is increased, the penetration of the resultant rubberized asphalt at 32° F. has been found to decrease hyperbolically. Also, the lower the viscosity of the flux the greater the rate of change in penetration of 32° F. by the addition of progressively increasing proportions of rubber.

The ductility of the rubberized product at 77° F. is generally increased by increasing the proportion of the neoprene rubber. However, where GRS rubber is used, an increase in the proportion of the rubber causes a decrease in ductility at 77° F.

Of particular interest, is the effect on ductility of the product at 39.2° F. The highest ductility at this temperature has been obtained where, in accordance with the present process, no blowing catalyst is used. The maximum ductility at this temperature is obtained by interblending with the blown asphalt of approximately 2% of butadiene-styrene synthetic rubber. Further increasing the amount of this rubber causes a surprising decrease in low-temperature ductility.

With respect to the staining properties of the rubberized blown asphalt, which are of particular importance where the product is to be used as a paper laminant, of primary importance is the softening point to which the asphalt is blown and the type and proportion of rubber interblended therewith. For this purpose, butadiene-styrene synthetic rubber has been found more effective than neoprene. While other rubbers have been found to decrease the stain characteristics, maximum effectiveness has been obtained by the interblending of about 2% of the GRS rubber with the blown asphalt. A much lower proportionate effect is obtained by increasing the proportion of rubber above 2%.

The following further examples are given as illustrative of the unique properties of products of our present invention:

By employing our unitary process described herein, we have, for example, air blown to a softening point of 137°

F. a flux of a vacuum reduced petroleum asphalt having an original penetration of 200–300 at 77° F. One portion of this blown asphalt was rubberized, as herein described, with an amount of butadiene-styrene synthetic rubber latex (GRS–2006) equivalent to 2.0% rubber solid and a second portion was rubberized with a proportion of the identical latex equivalent to 2.8% rubber solid. The physical properties of the unrubberized blown asphalt and of the rubberized asphalts produced therefrom, containing the indicated proportions of the rubber, are set forth in the following tabulation:

Table II

|  | Proportion of rubber | | |
| --- | --- | --- | --- |
|  | None | 2% | 2.8% |
| Softening point, °F | 137 | 144 | 154 |
| Penetration at 77° F | 36 | 53 | 54 |
| Penetration at 32° F | 19 | 15 | 11 |
| Penetration at 115° F | 196 | 178 | 175 |
| Ductility at 77° F | 100 | 79 | 150 |
| Ductility at 39.2° F | 0 | 4.8 | 21.7 |

As appears from the foregoing tabulated values, there was a marked and unpredictable improvement in the low-temperature ductility of our rubberized products, even though their softening points were materially increased over that of the unrubberized asphalt. These rubberized asphalt products are especially suitable as waterproofing materials and as bases for various rubberized plastic asphalt specialties.

By similar procedure, we have, as indicated, produced asphaltic compositions having the novel properties set forth in the following tabulation:

Table III

| Blowing conditions: | | | |
| --- | --- | --- | --- |
| Flux vis. at 210° F., SFS, sec | 164 | 45 | 309 |
| Blowing temp., °F., average | 466 | 486 | 487 |
| Rubber: | | | |
| Type (GRS) | 2006 | 2006 | 2006 |
| Percent | 3.3 | 2.5 | 2.2 |
| Softening point before rubberizing, °F | 125 | 152 | 129 |
| Properties after rubberizing: | | | |
| Softening point, °F | 153 | 174 | 141 |
| Penetration at 77° F., 100 g., 5 sec | 63 | 48 | 60 |
| Penetration at 32° F., 200 g., 60 sec | 33 | 29 | 33 |
| Penetration at 115° F., 50 g., 5 sec | 153 | 84 | 181 |
| Ductility at 77° F., 5 cm./min | 25.0 | 19.5 | 45.3 |
| Ductility at 39.2° F., 5 cm./min | 124 | 52 | 79.4 |

The effectiveness and versatility of our present process is further illustrated by the following compositions produced substantially as those shown in Table I except for the indicated flux viscosities and softening points to which the flux was blown:

Table IV

| Proportion of rubber, percent | None | 2.1 | None | 2.1 |
| --- | --- | --- | --- | --- |
| Type of rubber |  | (¹) |  | GRS |
| Flux viscosity, SFS | 106 | 106 | 293 | 293 |
| Softening Point, °F | 125 | 140 | 125 | 140 |
| Penetration at 77° F | 77 | 67 | 80 | 67 |
| Penetration at 32° F | 32 | 52 | 26 | 26 |
| Ductility at 77° F | 22 | 50 | 90 | 30 |
| Ductility at 39.2° F | 5 | 10 | 6 | 150+ |
| Stain | 62 | 56 | 62 | 48 |

¹ Neoprene 735.

The softening point, penetration and ductility values given herein were determined by established methods, the penetrations at 77° F. being determined for 100 gms./5 secs., those at 115° F. being determined for 50 gms./5 secs., those at 32° F. being determined for 200 gms./60 secs. and ductilities having been determined at 5 cms./min.

The stain tests were run by placing a sample of the composition to be tested in a ring, such as used for determining softening points, care being taken to remove all asphalt from the outside of the ring. The ring is then placed on a number 42 Whatman filter paper in a forced circulation oven and allowed to remain there for 24 hours at 75° C. The sum of the largest and smallest diameters of the stain, expressed in millimeters, produced on the filter paper is reported as the stain value.

Each of these products has its own unique advantages. We have found, however, that the neoprene rubber is more easily handled and has better stability at high temperatures. However, GRS rubber has been found superior with respect to low temperature ductility of the asphaltic composition.

As previously noted, our present process is not restricted to the use of any particular neoprene rubber or to any particular copolymer of butadiene-styrene, such as the GRS–2006 of the preceding examples. It is applicable to copolymers of styrene and butadiene in any proportions. Further, in the broader aspect of the invention, the proportion of rubber solids dispersed in the blown asphalt may be varied over a range extending from about 0.1% to about 10%, by weight.

We claim:

1. Method of producing rubberized asphaltic compositions comprising the following steps, air blowing an asphalt flux having a viscosity within the range extending from about 40 to about 300 SFS, at 210° F., in the absence of catalyst, to a softening point within the range extending from about 80° to about 165° F. and interblending the resultant blown asphalt with a rubber selected from the group consisting of natural rubber, neoprene rubber and the copolymers of butadiene and styrene by introducing the rubber in the form of an aqueous latex into a molten, highly fluid body of the blown asphalt at a point at which the asphalt is at a temperature such that the water content of the latex is flashed into steam upon contact with the asphalt thereby vigorously agitating the asphalt and quickly dispersing the rubber therein and suddenly lowering the temperature of the resultant mixture to below that at which the rubber is deleteriously affected.

2. The process of claim 1 in which the latex is introduced into a confined flowing stream of the hot asphalt and the resultant mixture is continued as a confined flowing stream for a period sufficient to insure uniform dispersion of the rubber throughout the asphalt and is then discharged into an open vessel for disengaging the steam from the mixture.

3. The process of claim 2 in which the temperature of the asphalt at the point of contact with the latex is within the range of 450° to 600° F. and this temperature is reduced to within the range of 350° to 400° F. upon contact with the latex.

4. The process of claim 1 in which the viscosity of the flux prior to blowing is within the range of 75 to 175 SFS at 210° F.

5. The process of claim 1 in which the flux is blown to a softening point within the range of 125 to 150° F.

6. The process of claim 1 in which the proportion of rubber solid interblended with the asphalt is within the range of 0.5% to 5% by weight.

7. An asphaltic composition consisting essentially of an asphalt which has been blown to a softening point within the range of 80° to 165° F. and rubber solids, the latter being present in proportions within the range of 0.1% to 10% by weight, said rubber solids being selected from the group consisting of natural rubber, neoprene rubber and the copolymers of butadiene and styrene.

8. The composition of claim 7 in which the rubber constituent is neoprene.

9. The composition of claim 7 in which the rubber constituent is a copolymer of butadiene and styrene.

10. An asphaltic composition consisting essentially of an air blown asphalt in which there is uniformly dispersed about 2% of butadiene-styrene synthetic rubber and having approximately the following characteristics:

| | |
|---|---|
| Softening point, °F | 144 |
| Penetration at 77° F | 53 |
| Penetration at 32° F | 15 |
| Ductility at 77° F | 79 |
| Ductility at 39.2° F | 4.8 |

11. An asphaltic composition consisting essentially of an air blown asphalt in which there is uniformly dispersed about 2.8% of butadiene-styrene synthetic rubber and having approximately the following characteristics:

| | |
|---|---|
| Softening point, °F | 154 |
| Penetration at 77° F | 54 |
| Penetration at 32° F | 11 |
| Ductility at 77° F | 150 |
| Ductility at 39.2° F | 21.7 |

12. An asphaltic composition consisting essentially of an air blown asphalt in which there is uniformly dispersed about 3.3% of a butadiene-styrene synthetic rubber and having approximately the following characteristics:

| | |
|---|---|
| Softening point, °F | 153 |
| Penetration at 77° F., 100 g., 5 sec | 63 |
| Penetration at 32° F., 200 g., 60 sec | 33 |
| Penetration at 115° F., 50 g., 5 sec | 153 |
| Ductility at 77° F., 5 cm./min | 25.0 |
| Ductility at 39.2° F., 5 cm./min | 124 |

13. An asphaltic composition consisting essentially of an air blown asphalt in which there is uniformly dispersed about 2.5% of butadiene-styrene synthetic rubber and having approximately the following characteristics:

| | |
|---|---|
| Softening point, °F | 174 |
| Penetration at 77° F., 100 g., 5 sec | 48 |
| Penetration at 32° F., 200 g., 60 sec | 29 |
| Penetration at 115° F., 50 g., 5 sec | 84 |
| Ductility at 77° F., 5 cm./min | 19.5 |
| Ductility at 39.2° F., 5 cm./min | 52 |

14. An asphaltic composition consisting essentially of an air blown asphalt in which there is uniformly dispersed about 2.2% of butadiene-styrene synthetic rubber and having approximately the following characteristics:

| | |
|---|---|
| Softening point, °F | 141 |
| Penetration at 77° F., 100 g., 5 sec | 60 |
| Penetration at 32° F., 200 g., 60 sec | 33 |
| Penetration at 115° F., 50 g., 5 sec | 181 |
| Ductility at 77° F., 5 cm./min | 45.3 |
| Ductility at 39.2° F., 5 cm./min | 79.4 |

15. An asphaltic composition consisting essentially of an air blown asphalt in which there is uniformly dispersed 2.1% of butadiene-styrene synthetic rubber and having approximately the following characteristics:

| | |
|---|---|
| Softening point, °F | 140 |
| Penetration at 77° F | 67 |
| Penetration at 32° F | 26 |
| Ductility at 77° F | 30 |
| Ductility at 39.2° F | 150+ |
| Stain | 48 |

16. An asphaltic composition consisting essentially of an air blown asphalt in which there is uniformly dispersed 2.1% of neoprene rubber and having approximately the following characteristics:

| | |
|---|---|
| Softening point, °F | 140 |
| Penetration at 77° F | 67 |
| Penetration at 32° F | 52 |
| Ductility at 77° F | 50 |
| Ductility at 39.2° F | 10 |
| Stain | 56 |

References Cited in the file of this patent

UNITED STATES PATENTS

| | | |
|---|---|---|
| 1,881,436 | Fischer | Oct. 11, 1932 |
| 2,029,410 | Carothers et al. | Feb. 4, 1936 |
| 2,578,001 | Cubberley et al. | Dec. 11, 1951 |
| 2,686,166 | Taylor | Aug. 10, 1954 |
| 2,830,963 | Traxler et al. | Apr. 15, 1958 |
| 2,841,060 | Coppage | July 1, 1958 |
| 2,921,105 | Benson | Jan. 12, 1960 |
| 2,921,313 | Odasz | Jan. 12, 1960 |